(12) United States Patent
Ono et al.

(10) Patent No.: US 9,068,074 B2
(45) Date of Patent: Jun. 30, 2015

(54) COMPOSITION FOR FORMATION OF CURED EPOXY RESIN, AND CURED PRODUCTS THEREOF

(75) Inventors: Kazuo Ono, Ichihara (JP); Natsuki Amanokura, Ichihara (JP); Hitoshi Matsumoto, Ichihara (JP); Emi Nakayama, Ichihara (JP)

(73) Assignees: NIPPON SODA CO., LTD., Tokyo (JP); NISSO CHEMICAL ANALYSIS SERVICE CO., LTD., Odawara (JP)

( * ) Notice: Subject to any disclaimer, the term of this patent is extended or adjusted under 35 U.S.C. 154(b) by 116 days.

(21) Appl. No.: 13/500,999

(22) PCT Filed: Oct. 15, 2010

(86) PCT No.: PCT/JP2010/006132
§ 371 (c)(1),
(2), (4) Date: Apr. 9, 2012

(87) PCT Pub. No.: WO2011/045941
PCT Pub. Date: Apr. 21, 2011

(65) Prior Publication Data
US 2012/0196991 A1 Aug. 2, 2012

(30) Foreign Application Priority Data
Oct. 16, 2009 (JP) .................. 2009-239832
Jan. 26, 2010 (JP) .................. 2010-014594

(51) Int. Cl.
| C08G 59/56 | (2006.01) |
| C08L 63/00 | (2006.01) |
| C08L 63/02 | (2006.01) |
| C08L 63/04 | (2006.01) |
| C08G 59/40 | (2006.01) |
| C08G 59/42 | (2006.01) |
| C08G 59/62 | (2006.01) |

(52) U.S. Cl.
CPC ............. *C08L 63/00* (2013.01); *C08G 59/4014* (2013.01); *C08G 59/42* (2013.01); *C08G 59/621* (2013.01)

(58) Field of Classification Search
None
See application file for complete search history.

(56) References Cited

U.S. PATENT DOCUMENTS

| 4,668,718 | A | 5/1987 | Schreiber |
| 6,916,890 | B1 * | 7/2005 | Woods et al. ............ 525/524 |
| 2004/0106764 | A1 | 6/2004 | Suzuki et al. |
| 2010/0022744 | A1 | 1/2010 | Kaneko et al. |
| 2010/0179250 | A1 | 7/2010 | Ono et al. |

FOREIGN PATENT DOCUMENTS

| JP | A-61-91218 | 5/1986 |
| JP | A-1-96278 | 4/1989 |
| JP | 4-2638 B2 * | 1/1992 |
| JP | B2-4-2638 | 1/1992 |
| JP | A-4-266922 | 9/1992 |
| JP | A-11-71449 | 3/1999 |
| JP | A-2004-307545 | 11/2004 |
| JP | A-2006-206731 | 8/2006 |

(Continued)

OTHER PUBLICATIONS

May 15, 2012 International Preliminary Report on Patentability issued in International Application No. PCT/JP2010/006132.

(Continued)

*Primary Examiner* — Robert Sellers
(74) *Attorney, Agent, or Firm* — Oliff PLC

(57) ABSTRACT

An object of the present invention is to provide a composition for the formation of a cured epoxy resin, wherein the composition can suppress a curing reaction at a low temperature to thereby enhance one-pack stability, and can also be subjected to a heating treatment to thereby effectively cure a resin. The present invention provides a composition for the formation of a cured epoxy resin, the composition comprising the following components (A), (B) and (C):

(A) an epoxy resin;
(B) a clathrate compound of a carboxylic acid derivative represented by formula (I):

$$R(COOH)n \quad (I);$$

and an imidazole compound represented by formula (II); and (C) a tetrakisphenol type compound represented by formula (III).

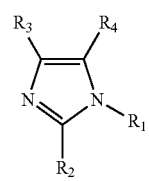

(II)

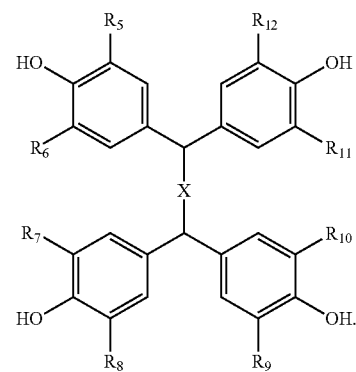

(III)

5 Claims, 5 Drawing Sheets

(56) References Cited

FOREIGN PATENT DOCUMENTS

| | | |
|---|---|---|
| JP | A-2006-299281 | 11/2006 |
| JP | A-2007-39449 | 2/2007 |
| JP | A-2007-191450 | 8/2007 |
| WO | WO 2008/075427 A1 | 6/2008 |
| WO | WO 2009/037862 A1 | 3/2009 |
| WO | WO 2010/103809 A1 | 9/2010 |
| WO | WO 2010/106780 A1 | 9/2010 |

OTHER PUBLICATIONS

International Search Report issued in International Patent Application No. PCT/JP2010/006132 dated Nov. 30, 2010.

* cited by examiner

COMPOSITION FOR FORMATION OF CURED EPOXY RESIN, AND CURED PRODUCTS THEREOF

TECHNICAL FIELD

The present invention relates to a composition for the formation of a cured epoxy resin, in particular, a composition for the formation of a cured epoxy resin in which a clathrate compound consisting of a carboxylic acid derivative and an imidazole compound is used as a curing catalyst.

This application claims priority to Japanese Patent Application No. 2009-239832 filed on Oct. 16, 2009, and Japanese Patent Application No. 2010-014594 filed on Jan. 26, 2010, the contents of which are herein incorporated.

BACKGROUND ART

An epoxy resin has excellent mechanical properties and thermal properties, and is therefore widely used in a variety of fields. An imidazole is used as a curing agent for curing such an epoxy resin, but the curing of an epoxy resin-imidazole mixed liquid starts quickly, and thus a problem thereof is that one-pack stability is extremely poor.

Then, as a curing agent, the use of an acid addition salt of an imidazole obtained by adding a hydroxybenzoic acid to an imidazole (see Patent Document 1), and the use of a clathrate of a tetrakisphenol type compound (such as 1,1,2,2,-tetrakis (4-hydroxyphenyl)ethane (hereinafter, referred to as TEP)) and an imidazole (see Patent Document 2) have been proposed. The acid addition salt of an imidazole and the clathrate exert a certain effect, but it has been desired to develop a curing agent having the same function or the enhanced function as those of the acid addition salt and the clathrate.

Under such circumstances, the applicant has developed a clathrate of an isophthalic acid type compound and an imidazole type compound, but the clathrate has been insufficient in terms of hardness in fields where higher hardness is required (Patent Document 3).

PRIOR ART DOCUMENTS

Patent Documents

Patent Document 1: Japanese examined Patent Publication No. 4-2638
Patent Document 2: Japanese unexamined Patent Application Publication No. 11-71449
Patent Document 3: Japanese unexamined Patent Application Publication No. 2007-39449

SUMMARY OF THE INVENTION

Object to be Solved by the Invention

An object of the present invention is to provide a composition for the formation of a cured epoxy resin, wherein the composition can suppress a curing reaction at a low temperature to thereby enhance one pot life, and can also be subjected to a heating treatment to thereby effectively cure a resin.

Means to Solve the Object

The present inventors have intensively studied in order to achieve the object, and as a result, have considered that it is necessary for enhancing the hardness of a resin to raise the glass transition point (Tg) of an epoxy resin, and have further studied. As a result, the present inventors have found that the addition of a certain amount of a tetrakisphenol type compound to a clathrate compound of a carboxylic acid derivative and an imidazole type compound allows Tg of a cured product of an epoxy resin to rise, and have completed the present invention.

That is, the present invention relates to:
(1) a composition for the formation of a cured epoxy resin, the composition comprising the following components (A), (B) and (C):
(A) an epoxy resin;
(B) a clathrate compound of a carboxylic acid derivative represented by formula (I):

$$R(COOH)_n \qquad (I)$$

(wherein, R represents an aliphatic hydrocarbon group that optionally has a substituent, an alicyclic hydrocarbon group that optionally has a substituent, an aromatic hydrocarbon group that optionally has a substituent, or a heterocyclic group that optionally has a substituent, and n represents any integer of 1 to 4);
and an imidazole compound represented by formula (II):

(wherein, $R_1$ represents a hydrogen atom, a C1 to C10 alkyl group, an aryl group, an arylalkyl group, or a cyanoethyl group, $R_2$ to $R_4$ each independently represents a hydrogen atom, a hydroxy group, a nitro group, a halogen atom, a C1 to C20 alkyl group that optionally has a hydroxy group, an aryl group, an arylalkyl group, or a C1 to C20 acyl group); and
(C) a tetrakisphenol type compound represented by formula (III):

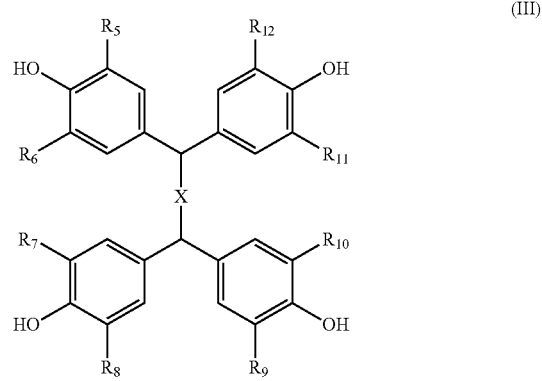

(wherein, X represents $(CH_2)_{n1}$ or a p-phenylene group, n1 represents any integer of 0 to 3, and $R_5$ to $R_{12}$ each represents a hydrogen atom, a C1 to C6 alkyl group, an optionally substituted phenyl group, a halogen atom, or a C1 to C6 alkoxy group);
(2) the composition for the formation of a cured epoxy resin according to (1), wherein the carboxylic acid derivative in the component (B) is a compound represented by formula (I-1) or (I-2):

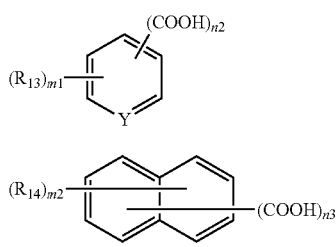
(I-1)

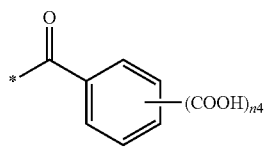
(I-2)

(wherein, $R_{13}$ represents a C1 to C6 alkyl group, a C1 to C6 alkoxy group, a nitro group, a hydroxy group, or a group represented by the following formula:

(wherein, n4 represents an integer of 1 or 2, and * represents a bonding position), $R_{14}$ represents a C1 to C6 alkyl group, a C1 to C6 alkoxy group, a nitro group, or a hydroxy group, Y represents CH or a N atom, m1 represents any integer of 0 to 2, m2 represents any integer of 0 to 4, n2 represents any integer of 1 to 4, and n3 represents any integer of 1 to 4);

(3) the composition for the formation of a cured epoxy resin according to (1) or (2), wherein the carboxylic acid derivative in the component (B) is an isophthalic acid compound represented by formula (I-3):

(I-3)

(wherein, $R_{15}$ represents a C1 to C6 alkyl group, a C1 to C6 alkoxy group, a nitro group, or a hydroxy group);

(4) the composition for the formation of a cured epoxy resin according to (3), wherein the isophthalic acid compound represented by formula (I-3) is 5-hydroxyisophthalic acid or 5-nitroisophthalic acid;

(5) the composition for the formation of a cured epoxy resin according to any one of (1) to (4), comprising 0.01 to 1.0 mol of the imidazole compound represented by formula (II) in the component (B) with respect to 1 mol of an epoxy ring;

(6) the composition for the formation of a cured epoxy resin according to any one of (1) to (5), wherein the imidazole compound represented by formula (II) in the component (B) is 2-ethyl-4-methylimidazole, 2-methylimidazole, 1-benzyl-2-methylimidazole, 2-heptadecylimidazole, 2-undecylimidazole, 2-phenyl-4-methyl-5-hydroxymethylimidazole, or 2-phenyl-4,5-dihydroxymethylimidazole; and (7) the composition for the formation of a cured epoxy resin according to any one of (1) to (6), wherein the clathrate compound in the component (B) is a curing catalyst for an epoxy resin.

The present invention also relates to:

(8) a cured product of an epoxy resin obtained by curing the composition for the formation of a cured epoxy resin according to any one of (1) to (7).

Figure 1:
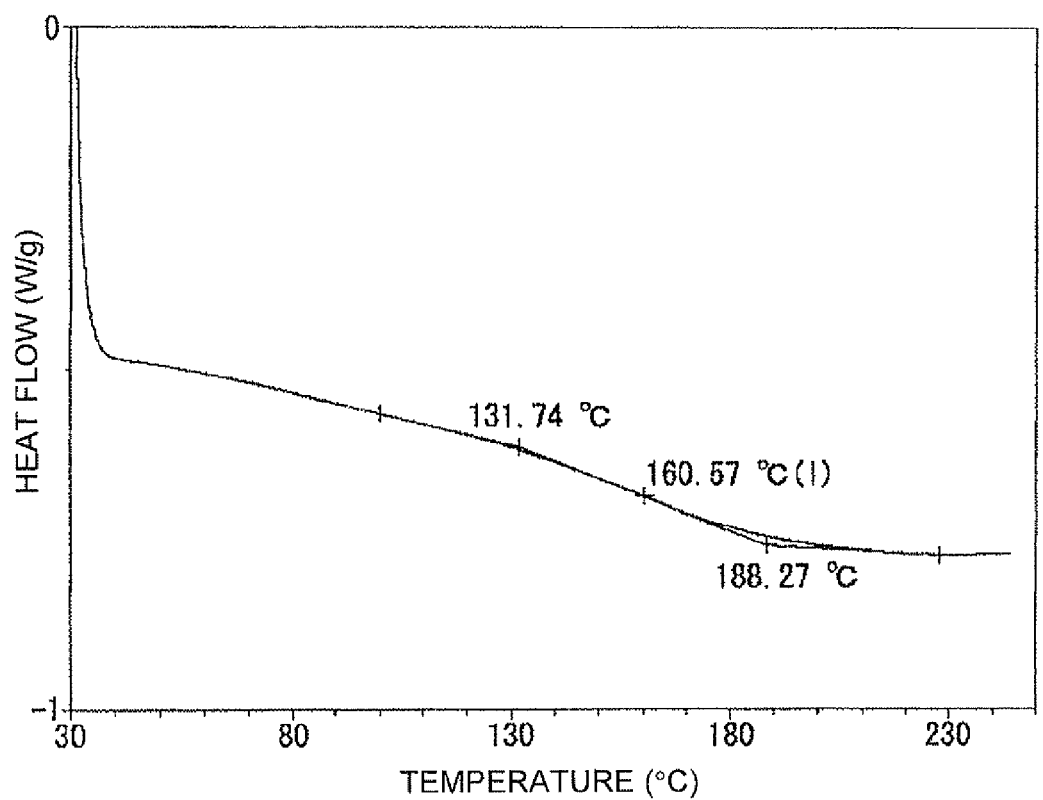
FIG. 1 is a diagram showing a thermal analysis (DSC) chart based on changes in temperature of a composition of Example 1.

MODE OF CARRYING OUT THE INVENTION (Clathrate Compound)

The clathrate compound of the present invention is not particularly limited as long as the clathrate compound is a clathrate compound including at least a carboxylic acid derivative represented by formula (I) and an imidazole compound represented by formula (II), and may contain a third component such as a solvent. In the present invention, the clathrate compound means a compound in which two or three or more molecules are bonded via a bond other than a covalent bond, and more preferably a crystalline compound in which two or three or more molecules are bonded via a bond other than a covalent bond. A clathrate compound of the present invention including an isophthalic acid compound represented by formula (I) and an imidazole compound represented by formula (II) can also be referred to as a salt formed by the isophthalic acid compound represented by formula (I) and the imidazole compound represented by formula (II).

A clathration ratio (molar ratio) of a carboxylic acid derivative represented by formula (I) to an imidazole compound represented by formula (II) varies depending on a combination of the carboxylic acid derivative and the imidazole compound, but the ratio is usually in the range of 1:0.1 to 5.

The clathrate compound of the present invention may be a compound in liquid form dissolved in a solvent, but is preferably a compound in powdery form (precipitated in a solvent). The compound in powdery form can be used in a powdery paint, for example.

(Carboxylic Acid Derivative)

The carboxylic acid derivative represented by formula (I):

$$R(COOH)n \qquad (I)$$

will be described. Herein, R is exemplified by the name of a monovalent group in which R is bonded to one carboxyl group. For a polyvalent carboxylic acid, R can be exemplified by a name appropriately read.

In the formula, R represents an aliphatic hydrocarbon group that optionally has a substituent, an alicyclic hydrocarbon group that optionally has a substituent, an aromatic hydrocarbon group that optionally has a substituent, or a heterocyclic group that optionally has a substituent, and n represents any integer of 1 to 4.

The "aliphatic hydrocarbon group" encompasses an alkyl group, an alkenyl group and an alkynyl group.

Examples of the "alkyl group" include a methyl group, an ethyl group, a n-propyl group, an i-propyl group, a n-butyl group, a s-butyl group, an i-butyl group, a t-butyl group, a n-pentyl group, a n-hexyl group, a nonyl group, an isononyl group, a decyl group, a lauryl group, a tridecyl group, a myristyl group, a pentadecyl group, a palmityl group, a heptadecyl group, and a stearyl group. A C1 to C6 alkyl group is preferable.

Examples of the "alkenyl group" include a vinyl group, a 1-propenyl group, a 2-propenyl group, a 1-butenyl group, a 2-butenyl group, a 3-butenyl group, a 1-methyl-2-propenyl group, a 2-methyl-2-propenyl group, a 1-pentenyl group, a 2-pentenyl group, a 3-pentenyl group, a 4-pentenyl group, a 1-methyl-2-butenyl group, a 2-methyl-2-butenyl group, a 1-hexenyl group, a 2-hexenyl group, a 3-hexenyl group, a 4-hexenyl group, a 5-hexenyl group, a heptenyl group, an octenyl group, a decenyl group, a pentadecenyl group, an eicosenyl group, and a tricosenyl group. A C2 to C6 alkenyl group is preferable.

Examples of the "alkynyl group" include an ethynyl group, a 1-propynyl group, a 2-propynyl group, a 1-butynyl group, a 2-butynyl group, a 3-butynyl group, a 1-methyl-2-propynyl group, a 2-methyl-2-propynyl group, a 1-pentynyl group, a 2-pentynyl group, a 3-pentynyl group, a 4-pentynyl group, a 1-methyl-2-butynyl group, a 2-methyl-2-butynyl group, a 1-hexynyl group, a 2-hexynyl group, a 3-hexynyl group, a 4-hexynyl group, a 5-hexynyl group, a 1-heptynyl group, a 1-octynyl group, a 1-decynyl group, a 1-pentadecynyl group, a 1-eicosynyl group, and a 1-tricosynyl group. A C2 to C6 alkynyl group is preferable.

The "alicyclic hydrocarbon group" refers to a monocyclic or polycyclic alkyl group, and examples thereof include a cyclopropyl group, a cyclobutyl group, a cyclopentyl group, a cyclohexyl group, a cycloheptyl group, a cyclooctyl group, a cyclododecyl group, a bicyclooctyl group, a bicycloheptyl group, a norbornyl group, and an adamantyl group. A C3 to C8 cycloalkyl group is preferable.

The "aromatic hydrocarbon group" means a monocyclic or polycyclic aryl group. Here, in the case of being a polycyclic aryl group, the aromatic hydrocarbon group also encompasses a partially saturated group in addition to a fully unsaturated group. Examples thereof include a phenyl group, a naphthyl group, an azulenyl group, an indenyl group, an indenyl group, and a tetralinyl group. A C6 to C10 aryl group is preferable.

The "heterocyclic group" means a 5- to 7-membered aromatic heterocycle, saturated heterocycle or unsaturated heterocycle having 1 to 4 nitrogen atoms, oxygen atoms or sulfur atoms as a hetero atom(s), or a condensed heterocycle obtained by condensing any of these heterocycles with a benzene ring, and examples thereof include a furan-2-yl group, a furan-3-yl group, a thiophen-2-yl group, a thiophen-3-yl group, a pyrrol-1-yl group, a pyrrol-2-yl group, a pyridin-2-yl group, a pyridin-3-yl group, a pyridin-4-yl group, a pyrazin-2-yl group, a pyrazin-3-yl group, a pyrimidin-2-yl group, a pyrimidin-4-yl group, a pyridazin-3-yl group, a pyridazin-4-yl group, a 1,3-benzodioxol-4-yl group, a 1,3-benzodioxol-5-yl group, a 1,4-benzodioxan-5-yl group, a 1,4-benzodioxan-6-yl group, a 3,4-dihydro-2H-1,5-benzodioxepin-6-yl group, a 3,4-dihydro-2H-1,5-benzodioxepin-7-yl group, a 2,3-dihydrobenzofuran-4-yl group, a 2,3-dihydrobenzofuran-5-yl group, a 2,3-dihydrobenzofuran-6-yl group, a 2,3-dihydrobenzofuran-7-yl group, a benzofuran-2-yl group, a benzofuran-3-yl group, a benzothiophen-2-yl group, a benzothiophen-3-yl group, a quinoxalin-2-yl group, a quinoxalin-5-yl group, an indol-1-yl group, an indol-2-yl group, an isoindol-1-yl group, an isoindol-2-yl group, an isobenzofuran-1-yl group, an isobenzofuran-4-yl group, a chromen-2-yl group, a chromen-3-yl group, an imidazol-1-yl group, an imidazol-2-yl group, an imidazol-4-yl group, a pyrazol-1-yl group, a pyrazol-3-yl group, a thiazol-2-yl group, a thiazol-4-yl group, an oxazol-2-yl group, an oxazol-4-yl group, an isoxazol-3-yl group, an isoxazol-4-yl group, a pyrrolidin-2-yl group, a pyrrolidin-3-yl group, a benzoimidazol-1-yl group, a benzoimidazol-2-yl group, a benzothiazol-2-yl group, a benzothiazol-4-yl group, a benzoxazol-2-yl group, a benzoxazol-4-yl group, a quinolin-2-yl group, a quinolin-3-yl group, an isoquinolin-1-yl group, an isoquinolin-3-yl group, a 1,3,4-thiadiazol-2-yl group, a 1,2,3-triazol-1-yl group, a 1,2,3-triazol-4-yl group, a tetrazol-1-yl group, a tetrazol-2-yl group, an indolin-4-yl group, an indolin-5-yl group, a morpholin-4-yl group, a piperazin-2-yl group, a piperidin-2-yl group, a 1,2,3,4-tetrahydroquinolin-5-yl group, a 1,2,3,4-tetrahydroquinolin-6-yl group, a 1,2,3,4-tetrahydroisoquinolin-5-yl group, and a 1,2,3,4-tetrahydroisoquinolin-6-yl group.

Examples of the "substituent" in "that optionally has a substituent" include a C1 to C6 alkyl group, a C1 to C6 alkoxy group, a nitro group, a hydroxy group, or a group represented by the following formula:

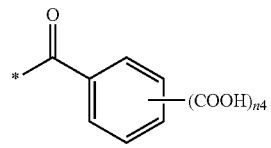

(wherein, n4 represents an integer of 1 or 2, and * represents a bonding position).

Specific examples of the carboxylic acid derivative can include the following compounds.

As an aliphatic carboxylic acid, an aliphatic di- to tetravalent carboxylic acid and a hydroxy aliphatic polyvalent carboxylic acid are preferable. Representative examples thereof can include fumaric acid, 1,3-cyclohexanedicarboxylic acid, trans-1,4-cyclohexanedicarboxylic acid, succinic acid, malonic acid, tartaric acid, maleic acid, citric acid, malic acid, and adipic acid. These aliphatic carboxylic acids may be used alone or in combination of two or more thereof.

Examples of an aromatic carboxylic acid can include the following compounds:

benzoic acid, 2-methylbenzoic acid, 3-methylbenzoic acid, 4-methylbenzoic acid, 2-ethylbenzoic acid, 3-ethylbenzoic acid, 4-ethylbenzoic acid, 2-n-propylbenzoic acid, 3-n-propylbenzoic acid, 4-n-propylbenzoic acid, 2-butylbenzoic acid, 3-butylbenzoic acid, 4-butylbenzoic acid, 2-isopropylbenzoic acid, 3-isopropylbenzoic acid, 4-isopropylbenzoic acid, 2-isobutylbenzoic acid, 3-isobutylbenzoic acid, 4-isobutylbenzoic acid, 2-hydroxybenzoic acid, 3-hydroxybenzoic acid, 4-hydroxybenzoic acid, 2-nitrobenzoic acid, 3-nitrobenzoic acid, 4-nitrobenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 3,6-dimethylbenzoic acid, 4,5-dimethylbenzoic acid, 4,6-dimethylbenzoic acid, 2,3-diethylbenzoic acid, 2,4-diethylbenzoic acid, 2,5-diethylbenzoic acid, 2,6-diethylbenzoic acid, 3,4-diethylbenzoic acid, 3,5-diethylbenzoic acid, 3,6-diethylbenzoic acid, 4,5-diethylbenzoic acid, 4,6-diethylbenzoic acid, 2,3-dihydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 3,6-dihydroxybenzoic acid, 4,5-dihydroxybenzoic acid, and 4,6-dihydroxybenzoic acid;

phthalic acid, 3-methylphthalic acid, 4-methylphthalic acid, 5-methylphthalic acid, 6-methylphthalic acid, 3-ethylphthalic acid, 4-ethylphthalic acid, 5-ethylphthalic acid, 6-ethylphthalic acid, 3-n-propylphthalic acid, 4-n-propylphthalic acid, 5-n-propylphthalic acid, 6-n-propylphthalic acid, 3-butylphthalic acid, 4-butylphthalic acid, 5-butylphthalic acid, 6-butylphthalic acid, 3-isopropylphthalic acid, 4-isopropylphthalic acid, 5-isopropylphthalic acid, 6-isopropylphthalic acid, 3-isobutylphthalic acid, 4-isobutylphthalic acid, 5-isobutylphthalic acid, 6-isobutylphthalic acid, 3-hydroxyphthalic acid, 4-hydroxyphthalic acid, 5-hydroxyphthalic acid, 6-hydroxyphthalic acid, 3,4-dihydroxyphthalic acid, 3,5-dihydroxyphthalic acid, 3,6-dihydroxyphthalic acid, 4,5-dihydroxyphthalic acid, 4,6-dihydroxyphthalic acid, 3-nitrophthalic acid, 4-nitrophthalic acid, 5-nitrophthalic acid, 6-nitrophthalic acid, 3,4-dimethylphthalic acid, 3,5-dimethylphthalic acid, 3,6-dimethylphthalic acid, 4,5-dimethylphthalic acid, and 4,6-dimethylphthalic acid;

isophthalic acid, 2-methylisophthalic acid, 4-methylisophthalic acid, 5-methylisophthalic acid, 6-methylisophthalic acid, 2-ethylisophthalic acid, 4-ethylisophthalic acid, 5-ethylisophthalic acid, 6-ethylisophthalic acid, 2-n-propylisophthalic acid, 4-n-propylisophthalic acid, 5-n-propylisophthalic acid, 6-n-propylisophthalic acid, 2-isopropylisophthalic acid, 4-isopropylisophthalic acid, 5-isopropylisophthalic acid, 6-isopropylisophthalic acid, 2-butylisophthalic acid, 4-butylisophthalic acid, 5-butylisophthalic acid, 6-butylisophthalic acid, 2-isobutylisophthalic acid, 4-isobutylisophthalic acid, 5-isobutylisophthalic acid, 6-isobutylisophthalic acid, 4-t-butylisophthalic acid, 5-t-butylisophthalic acid, 6-t-butylisophthalic acid, 2-hydroxyisophthalic acid, 4-hydroxyisophthalic acid, 5-hydroxyisophthalic acid, 6-hydroxyisophthalic acid, 2,4-dihydroxyisophthalic acid, 2,5-dihydroxyisophthalic acid, 2,6-dihydroxyisophthalic acid, 4,5-dihydroxyisophthalic acid, 4,6-dihydroxyisophthalic acid, 5,6-dihydroxyisophthalic acid, 2,4-dimethylisophthalic acid, 2,5-dimethylisophthalic acid, 2,6-dimethylisophthalic acid, 4,5-dimethylisophthalic acid, 4,6-dimethylisophthalic acid, 5,6-dimethylisophthalic acid, 2-nitroisophthalic acid, 4-nitroisophthalic acid, 5-nitroisophthalic acid, 6-nitroisophthalic acid, 2-methylterephthalic acid, 2-ethylterephthalic acid, 2-n-propylterephthalic acid, 2-isopropylterephthalic acid, 2-butylterephthalic acid, 2-isobutylterephthalic acid, 2-hydroxyterephthalic acid, 2,6-dihydroxyterephthalic acid, 2,6-dimethylterephthalic acid, 2-nitroterephthalic acid, 1,2,3-benzenetricarboxylic acid, 1,2,4-benzenetricarboxylic acid (trimellitic acid), 1,2,5-benzenetricarboxylic acid, 1,3,4-benzenetricarboxylic acid, 1,3,5-benzenetricarboxylic acid (trimeric acid), 4-hydroxy-1,2,3-benzenetricarboxylic acid, 5-hydroxy-1,2,3-benzenetricarboxylic acid, 3-hydroxy-1,2,4-benzenetricarboxylic acid, 5-hydroxy-1,2,4-benzenetricarboxylic acid, 6-hydroxy-1,2,4-benzenetricarboxylic acid, and 1,2,4,5-benzenetetracarboxylic acid (pyromellitic acid);

1-naphthoic acid, 2-naphthoic acid, 2-methyl-1-naphthoic acid, 3-methyl-1-naphthoic acid, 4-methyl-1-naphthoic acid, 5-methyl-1-naphthoic acid, 6-methyl-1-naphthoic acid, 7-methyl-1-naphthoic acid, 8-methyl-1-naphthoic acid, 1-methyl-2-naphthoic acid, 3-methyl-2-naphthoic acid, 4-methyl-2-naphthoic acid, 5-methyl-2-naphthoic acid, 6-methyl-2-naphthoic acid, 7-methyl-2-naphthoic acid, 8-methyl-2-naphthoic acid, 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,4-naphthalenedicarboxylic acid, 2,5-naphthalenedicarboxylic acid, 2,6-naphthalenedicarboxylic acid, 2,7-naphthalenedicarboxylic acid, 2,8-naphthalenedicarboxylic acid, 2-hydroxy-1-naphthoic acid, 3-hydroxy-1-naphthoic acid, 4-hydroxy-1-naphthoic acid, 5-hydroxy-1-naphthoic acid, 6-hydroxy-1-naphthoic acid, 7-hydroxy-1-naphthoic acid, 8-hydroxy-1-naphthoic acid, 1-hydroxy-2-naphthoic acid, 3-hydroxy-2-naphthoic acid, 4-hydroxy-2-naphthoic acid, 5-hydroxy-2-naphthoic acid, 6-hydroxy-2-naphthoic acid, 7-hydroxy-2-naphthoic acid, 8-hydroxy-2-naphthoic acid, 1,2,4,5-naphthalenetetracarboxylic acid, 2,3-dihydroxy-1-naphthoic acid, 2,4-dihydroxy-1-naphthoic acid, 2,5-dihydroxy-1-naphthoic acid, 2,6-dihydroxy-1-naphthoic acid, 2,7-dihydroxy-1-naphthoic acid, 2,8-dihydroxy-1-naphthoic acid, 3,4-dihydroxy-1-naphthoic acid, 3,5-dihydroxy-1-naphthoic acid, 3,6-dihydroxy-1-naphthoic acid, 3,7-dihydroxy-1-naphthoic acid, 3,8-dihydroxy-1-naphthoic acid, 4,5-dihydroxy-1-naphthoic acid, 4,6-hydroxydihydroxynaphthoic acid, 4,7-dihydroxy-1-naphthoic acid, 4,8-dihydroxy-1-naphthoic acid, 5,6-dihydroxy-1-naphthoic acid, 5,7-dihydroxy-1-naphthoic acid, 5,8-dihydroxy-1-naphthoic acid, 6,7-dihydroxy-1-naphthoic acid, 6,8-dihydroxy-1-naphthoic acid, 7,8-dihydroxy-1-naphthoic acid, 1,3-dihydroxy-2-naphthoic acid, 1,4-dihydroxy-2-naphthoic acid, 1,5-dihydroxy-2-naphthoic acid, 1,6-dihydroxy-2-naphthoic acid, 1,7-dihydroxy-2-naphthoic acid, 1,8-dihydroxy-2-naphthoic acid, 3,4-dihydroxy-2-naphthoic acid, 3,5-dihydroxy-2-naphthoic acid, 3,6-dihydroxy-2-naphthoic acid, 3,8-dihydroxy-2-naphthoic acid, 4,5-dihydroxy-2-naphthoic acid, 4,6-dihydroxy-2-naphthoic acid, 4,7-dihydroxy-2-naphthoic acid, 4,8-dihydroxy-2-naphthoic acid, 5,6-dihydroxy-2-naphthoic acid, 5,7-dihydroxy-2-naphthoic acid, 5,8-dihydroxy-2-naphthoic acid, 6,7-dihydroxy-2-naphthoic acid, 6,8-dihydroxy-2-naphthoic acid, 7,8-dihydroxy-2-naphthoic acid, cyclohexanecarboxylic acid, 1,2-cyclohexanedicarboxylic acid, 1,3-cyclohexanedicarboxylic acid, 1,4-cyclohexanedicarboxylic acid, 1,1-cyclohexanedicarboxylic acid, 1,2-decahydronaphthalenedicarboxylic acid, 1,3-decahydronaphthalenedicarboxylic acid, 1,4-decahydronaphthalenedicarboxylic acid, 1,5-decahydronaphthalenedicarboxylic acid, 1,6-decahydronaphthalenedicarboxylic acid, 1,7-decahydronaphthalenedicarboxylic acid, and 1,8-decahydronaphthalenedicarboxylic acid.

These aromatic carboxylic acid compounds may be used alone or in combination of two or more thereof.

Examples of a heterocyclic carboxylic acid include furancarboxylic acid, thiophenecarboxylic acid, pyrrolecarboxylic acid, pyrazinecarboxylic acid, nicotinic acid, isonicotinic acid, and picolinic acid. These heterocyclic carboxylic acid compounds may be used alone or in combination of two or more thereof.

Among the carboxylic acid derivatives, preferable is an aromatic (heterocyclic) carboxylic acid represented by the following formula (I-1) or (I-2):

Formula (I-1) or (I-2)

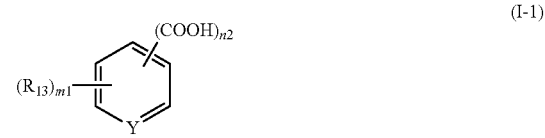

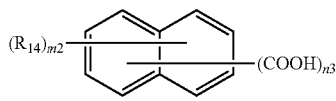

In the formula (I-1) and formula (I-2), $R_{13}$ represents a C1 to C6 alkyl group, a C1 to C6 alkoxy group, a nitro group, a hydroxy group, or a group represented by the following formula:

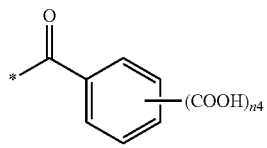

(wherein, n4 represents an integer of 1 or 2, and * represents a bonding position), $R_{14}$ represents a C1 to C6 alkyl group, a C1 to C6 alkoxy group, a nitro group, or a hydroxy group, Y represents CH or a N atom, m1 represents any integer of 0 to 2, m2 represents any integer of 0 to 4, n2 represents any integer of 1 to 4, and n3 represents any integer of 1 to 4.

The C1 to C6 alkyl group is preferably a C1 to C4 alkyl group, and optionally has a substituent. Specific examples of the C1 to C6 alkyl group can include a methyl group, an ethyl group, a propyl group, an isopropyl group, a cyclopropyl group, a butyl group, an isobutyl group, a s-butyl group, a t-butyl group, a cyclobutyl group, a cyclopropylmethyl group, a pentyl group, an isopentyl group, a 2-methylbutyl group, a neopentyl group, a 1-ethylpropyl group, a hexyl group, an isohexyl group, a 4-methylpentyl group, a 3-methylpentyl group, a 2-methylpentyl group, a 1-methylpentyl group, a 3,3-dimethylbutyl group, a 2,2-dimethylbutyl group, a 1,1-dimethylbutyl group, a 1,2-dimethylbutyl group, a 1,3-dimethylbutyl group, a 2,3-dimethylbutyl group, a 1-ethylbutyl group, and a 2-ethylbutyl group.

The C1 to C6 alkoxy group is preferably a C1 to C4 alkoxy group, and optionally has a substituent. Specific examples of the C1 to C6 alkoxy group can include a methoxy group, an ethoxy group, a propoxy group, an isopropoxy group, a butoxy group, an isobutoxy group, a s-butoxy group, a t-butoxy group, a pentoxy group, an isopentoxy group, a 2-methylbutoxy group, a 1-ethylpropoxy group, a 2-ethylpropoxy group, a neopentoxy group, a hexyloxy group, a 4-methylpentoxy group, a 3-methylpentoxy group, a 2-methylpentoxy group, a 3,3-dimethylbutoxy group, a 2,2-dimethylbutoxy group, a 1,1-dimethylbutoxy group, a 1,2-dimethylbutoxy group, a 1,3-dimethylbutoxy group, and a 2,3-dimethylbutoxy.

Among them, preferable is an isophthalic acid compound represented by formula (I-3):

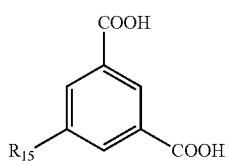

In the formula, $R_{15}$ represents a C1 to C6 alkyl group, a C1 to C6 alkoxy group, a nitro group, or a hydroxy group.

Examples of the C1 to C6 alkyl group and the C1 to C6 alkoxy group include the same groups as exemplified for $R_{13}$ and $R_{14}$ in formulae (I-1) and (I-2).

Specifically, the isophthalic acid compound represented by formula (I-3) is preferably 5-hydroxyisophthalic acid or 5-nitroisophthalic acid.

(Imidazole Compound)

Then, the imidazole compound represented by formula (II) will be described.

In the formula, $R_1$ represents a hydrogen atom, a C1 to C10 alkyl group, an aryl group, an arylalkyl group, or a cyanoethyl group, and preferably represents a hydrogen atom.

The C1 to C10 alkyl group is preferably a C1 to C6 alkyl group, and optionally has a substituent. Specific examples of the C1 to C10 alkyl group can include a heptyl group, an octyl group, a nonyl group, and a decyl group, in addition to the above-described alkyl group.

The aryl group means a monocyclic or polycyclic aryl group. Here, in the case of being a polycyclic aryl group, the aryl group also encompasses a partially saturated group in addition to a fully unsaturated group. Examples thereof include a phenyl group, a naphthyl group, an azulenyl group, an indenyl group, an indanyl group, and a tetralinyl group. The aryl group is preferably a C6 to C10 aryl group.

The arylalkyl group means a group in which the aryl group and the C1 to C10 alkyl group are bonded to each other. Examples thereof include a benzyl group, a phenethyl group, a 3-phenyl-n-propyl group, a 4-phenyl-n-butyl group, a 5-phenyl-n-pentyl group, an 8-phenyl-n-octyl group, and a naphthylmethyl group. The arylalkyl group is preferably a C6 to C10 aryl C1 to C6 alkyl group.

$R_2$ to $R_4$ each independently represent a hydrogen atom, a hydroxy group, a nitro group, a halogen atom, a C1 to C20 alkyl group that optionally has a hydroxy group, an aryl group, an arylalkyl group, or a C1 to C20 acyl group, more preferably, each independently, represent a hydrogen atom, a hydroxy group, a nitro group, a halogen atom, a C1 to C17 alkyl group that optionally has a hydroxy group, a C6 to C10 aryl group, a C6 to C10 aryl C1 to C6 alkyl group C6 to C10 aryl C1 to C6 alkyl group, or a C1 to C17 acyl group, and still more preferably, each independently, represent a hydrogen atom, a hydroxy group, a nitro group, a halogen atom, a C1 to C10 alkyl group that optionally has a hydroxy group, a phenyl group, a benzyl group, or a C1 to C10 acyl group.

The C1 to C20 alkyl group, the aryl group, and the arylalkyl group are as described above.

The C1 to C20 acyl group is preferably a C1 to C10 acyl group and more preferably a C1 to C6 acyl group, and specific examples thereof can include a formyl group, an acetyl group, a propionyl group, a butyryl group, a valeryl group, and benzoyl group.

Specific examples of the imidazole compound represented by formula (II) can include 2-ethyl-4-methylimidazole, 2-methylimidazole, 1-benzyl-2-methylimidazole, 2-heptadecylimidazole, 2-undecylimidazole, 2-phenyl-4-methyl-5-hydroxymethylimidazole (2P4MHZ), 2-phenylimidazole, 2-phenyl-4-methylimidazole, 1-benzyl-2-phenylimidazole, 1,2-dimethylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, and 2-phenyl-4,5-dihydroxymethylimidazole, and the imidazole compound is preferably 2-ethyl-4-methylimidazole, 2-methylimidazole, 1-benzyl-2-methylimidazole, 2-heptadecylimidazole, 2-undecylimidazole, 2-phenyl-4-methyl-5-hydroxymethylimidazole (2P4MHZ), or 2-phenyl-4,5-dihydroxymethylimidazole.

(Method for Producing Clathrate compound)

The above-described clathrate compound of the present invention can be produced by a method described in Japanese unexamined Patent Application Publication No. 2007-39449, for example, and the summary of the method will be described below.

The clathrate compound can be obtained as follows: a carboxylic acid derivative represented by formula (I) and an imidazole compound represented by formula (II) are added to a solvent, which is then subjected to a heating treatment or a heating/refluxing treatment with stirring if necessary, to precipitate the clathrate compound.

The solvent is not particularly limited unless the solvent interferes with obtaining the compound of the present invention, and examples of the solvent that can be used include water, methanol, ethanol, ethyl acetate, methyl acetate, diethyl ether, dimethyl ether, acetone, methylethylketone, and acetonitrile. With respect to the proportion of the carboxylic acid derivative represented by formula (I) and the imidazole compound represented by formula (II) to be added during the production of the clathrate compound of the present invention, the amount of the imidazole compound represented by formula (II) (guest) is preferably in the range of 0.1 to 5.0 mol, and more preferably in the range of 0.5 to 3.0 mol, relative to 1 mol of the carboxylic acid derivative represented by formula (I) (host).

The heating condition during the production of the clathrate compound of the present invention is not particularly limited as long as, after at least the carboxylic acid derivative represented by formula (I) and the imidazole compound represented by formula (II) are dissolved in the solvent and heated, the compound of the present invention can be obtained, and the heating temperature can be, for example, in the range of 40 to 120° C., and more preferably in the range of 50 to 90° C.

(Tetrakisphenol Type Compound)

In the formula (III), X represents $(CH_2)_{n1}$ or a phenylene group, n1 represents 0, 1, 2 or 3, and $R_5$ to $R_{12}$ may be the same or different from one another and represent a hydrogen atom; a C1 to C6 alkyl group such as a methyl group, a propyl group, an isopropyl group, a n-butyl group, an isobutyl group, a t-butyl group, a n-hexyl group, or a cyclohexyl group; a phenyl group that may be substituted with a halogen atom, a C1 to C6 alkyl group, or the like; a halogen atom such as a fluorine atom, a chlorine atom, a bromine atom, or an iodine atom; or a C1 to C6 alkoxy group such as a methoxy group, an ethoxy group, or a t-butoxy group.

The tetrakisphenol type compound to be used in the present invention is not particularly limited as long as the compound is a compound represented by general formula (III), and specific examples thereof can include 1,1,2,2-tetrakis(4-hydroxyphenyl)ethane, 1,1,2,2-tetrakis(3-methyl-4-hydroxyphenyl)ethane, 1,1,2,2-tetrakis(3,5-dimethyl-4-hydroxyphenyl)ethane, 1,1,2,2-tetrakis(3-chloro-4-hydroxyphenyl)ethane, 1,1,2,2-tetrakis(3,5-dichloro-4-hydroxyphenyl)ethane, 1,1,2,2-tetrakis(3-bromo-4-hydroxyphenyl)ethane, 1,1,2,2-tetrakis(3,5-dibromo-4-hydroxyphenyl)ethane, 1,1,2,2-tetrakis(3-t-butyl-4-hydroxyphenyl)ethane, 1,1,2,2-tetrakis(3,5-di-t-butyl-4-hydroxyphenyl)ethane, 1,1,2,2-tetrakis(3-fluoro-4-hydroxyphenyl)ethane, 1,1,2,2-tetrakis(3,5-difluoro-4-hydroxyphenyl)ethane, 1,1,2,2-tetrakis(3-methoxy-4-hydroxyphenyl)ethane, 1,1,2,2-tetrakis(3,5-dimethoxy-4-hydroxyphenyl)ethane, 1,1,2,2-tetrakis(3-chloro-5-methyl-4-hydroxyphenyl)ethane, 1,1,2,2-tetrakis(3-bromo-5-methyl-4-hydroxyphenyl)ethane, 1,1,2,2-tetrakis(3-methoxy-5-methyl-4-hydroxyphenyl)ethane, 1,1,2,2-tetrakis(3-t-butyl-5-methyl-4-hydroxyphenyl)ethane, 1,1,2,2-tetrakis(3-chloro-5-bromo-4-hydroxyphenyl)ethane, 1,1,2,2-tetrakis(3-chloro-5-phenyl-4-hydroxyphenyl)ethane, 1,1,2,2-tetrakis[(4-hydroxy-3-phenyl)phenyl]ethane, 1,1,3,3-tetrakis(4-hydroxyphenyl)propane, 1,1,3,3-tetrakis(3-methyl-4-hydroxyphenyl)propane, 1,1,3,3-tetrakis(3,5-dimethyl-4-hydroxyphenyl)propane, 1,1,3,3-tetrakis(3-chloro-4-hydroxyphenyl)propane, 1,1,3,3-tetrakis(3,5-dichloro-4-hydroxyphenyl)propane, 1,1,3,3-tetrakis(3-bromo-4-hydroxyphenyl)propane, 1,1,3,3-tetrakis(3,5-dibromo-4-hydroxyphenyl)propane, 1,1,3,3-tetrakis(3-phenyl-4-hydroxyphenyl)propane, 1,1,3,3-tetrakis(3,5-diphenyl-4-hydroxyphenyl)propane, 1,1,3,3-tetrakis(3-methoxy-4-hydroxyphenyl)propane, 1,1,3,3-tetrakis(3,5-dimethoxy-4-hydroxyphenyl)propane, 1,1,3,3-tetrakis(3-t-butyl-4-hydroxyphenyl)propane, 1,1,3,3-tetrakis(3,5-di-t-butyl-4-hydroxyphenyl)propane, 1,1,4,4-tetrakis(4-hydroxyphenyl)butane, 1,1,4,4-tetrakis(3-methyl-4-hydroxyphenyl)butane, 1,1,4,4-tetrakis(3,5-dimethyl-4-hydroxyphenyl)butane, 1,1,4,4-tetrakis(3-chloro-4-hydroxyphenyl)butane, 1,1,4,4-tetrakis(3,5-dichloro-4-hydroxyphenyl)butane, 1,1,4,4-tetrakis(3-methoxy-4-hydroxyphenyl)butane, 1,1,4,4-tetrakis(3,5-dimethoxy-4-hydroxyphenyl)butane, 1,1,4,4-tetrakis(3-bromo-4-hydroxyphenyl)butane, 1,1,4,4-tetrakis(3,5-dibromo-4-hydroxyphenyl)butane, 1,1,4,4-tetrakis(3-t-butyl-4-hydroxyphenyl)butane, and 1,1,4,4-tetrakis(3,5-di-t-butyl-4-hydroxyphenyl)butane. These tetrakisphenol compounds each may be used alone, or in combination of two or more thereof.

With respect to the proportion of the component (B) in the composition for the formation of a cured epoxy resin of the present invention, the amount of the imidazole compound represented by formula (II) to be contained in the component (B) is preferably in the range of 0.01 to 3 mol and more preferably in the range of 0.01 to 1 mol, relative to 1 mol of an epoxy ring in an epoxy resin. In addition, the amount of the tetrakisphenol type compound is usually 0.001% by mol to 100% by mol, preferably 0.01% by mol to 50% by mol, and more preferably 1% by mol to 20% by mol, relative to the amount of the carboxylic acid derivative in the component (B).

(Epoxy Resin)

As the epoxy resin, various conventionally known polyepoxy compounds can be used, and examples thereof include aromatic type glycidylether compounds such as bis(4-hydroxyphenyl)propane diglycidylether, bis(4-hydroxy-3,5-dibromophenyl)propane diglycidylether, bis(4-hydroxyphenyl)ethane diglycidylether, bis(4-hydroxyphenyl)methane diglycidylether, resorcinol diglycidylether, phloroglycinol triglycidylether, trihydroxy biphenyl triglycidylether, tetraglycidyl benzophenone, bisresorcinol tetraglycidylether, tetramethyl bisphenol A diglycidylether, bisphenol C diglycidylether, bisphenol hexafluoropropane diglycidylether, 1,3-bis[1-(2,3-epoxypropoxy)-1-trifluoromethyl-2,2,2-trifluoroethyl]benzene, 1,4-bis[1-(2,3-epoxypropoxy)-1-trifluoromethyl-2,2,2-trifluoromethyl]benzene, 4,4'-bis(2,3-epoxypropoxy)octafluorobiphenyl, and phenol novolak type bisepoxy compounds; alicyclic polyepoxy compounds such as alicyclic diepoxyacetal, alicyclic diepoxy adipate, alicyclic diepoxy carboxylate, and vinylcyclohexene dioxide; glycidylester compounds such as diglycidyl phthalate, diglycidyl tetrahydrophthalate, diglycidyl hexahydrophthalate, dimethylglycidyl phthalate, dimethylglycidyl hexahydrophthalate, diglycidyl-p-oxybenzoate, diglycidylcyclopentane-1,3-dicarboxylate, and dimer acid glycidylester; glycidyl amine compounds such as diglycidyl aniline, diglycidyl toluidine, triglycidyl aminophenol, tetraglycidyl diamino diphenylmethane, and diglycidyl tribromoaniline; and heterocyclic epoxy compounds such as diglycidylhydantoin, glycidyl glycidoxyalkylhydantoin, and triglycidyl isocyanurate.

(Composition for Formation of Cured Epoxy Resin and Cured Product Thereof)

The composition for the formation of a cured epoxy resin of the present invention can be produced by mixing an epoxy resin, a clathrate compound and a tetrakisphenol type compound, wherein the mixing is usually performed with heating to about 60 to 100° C. so as to form a sufficient mixing state. The one-pack stability at that temperature plays a key role in the production of a cured epoxy resin.

The method for producing a cured epoxy resin of the present invention is not particularly limited as long as the method is a method of subjecting the composition for the formation of a cured epoxy resin to a heat treatment to cure the composition, and the heating temperature at the heat treatment is usually 60 to 250° C., and preferably 80 to 200° C.

The composition for the formation of a cured epoxy resin of the present invention may be compounded with various additives, if necessary, such as a curing agent, a curing accelerator, a plasticizer, an organic solvent, a reactive diluent, an extender, a filler, a reinforcing agent, a pigment, a flame retardant, a thickening agent, and a releasing agent.

The curing agent or the curing accelerator that can be used is an arbitrary one selected from among those commonly used as a conventional curing agent or curing accelerator for an epoxy resin. Examples thereof include amine type compounds such as aliphatic amines, alicyclic and heterocyclic amines, aromatic amines, and modified amines; imidazole type compounds, imidazoline type compounds, amide type compounds, ester type compounds, phenol type compounds, alcohol type compounds, thiol type compounds, ether type compounds, thioether type compounds, urea type compounds, thiourea type compounds, Lewis acid type compounds, phosphorus type compounds, acid anhydride type compounds, onium salt type compounds, and active silicon compound-aluminum complexes.

Specific examples of the curing agent and the curing accelerator include the following compounds.

Examples of the aliphatic amines include ethylenediamine, trimethylenediamine, triethylenediamine, tetramethylenediamine, hexamethylenediamine, diethylenetriamine, triethylenetetramine, tetraethylenepentamine, dipropylenediamine, dimethylamino propylamine, diethylaminopropylamine, trimethylhexamethylenediamine, pentanediamine, bis(2-dimethylaminoethyl)ether, pentamethyldiethylenetriamine, alkyl-t-monoamine, 1,4-diazabicyclo(2,2,2)octane(triethylenediamine), N,N,N',N'-tetramethylhexamethylenediamine, N,N,N',N'-tetramethylpropylenediamine, N,N,N',N'-tetramethylethylenediamine, N,N-dimethylcyclohexylamine, dibutylaminopropylamine, dimethylaminoethoxyethoxyethanol, triethanolamine, and dimethylaminohexanol.

Examples of the alicyclic and heterocyclic amines include piperidine, piperazine, methanediamine, isophoronediamine, methylmorpholine, ethylmorpholine, N,N',N''-tris(dimethylaminopropyl)hexahydro-s-triazine, a 3,9-bis(3-aminopropyl)-2,4,8,10-tetraoxyspiro(5,5)undecane adduct, N-aminoethylpiperazine, trimethylaminoethylpiperazine, bis(4-aminocyclohexyl)methane, N,N'-dimethylpiperazine, and 1,8-diazabicyclo(4.5.0)undec-7-ene.

Examples of the aromatic amines include o-phenylenediamine, m-phenylenediamine, p-phenylenediamine, diaminodiphenylmethane, diaminodiphenylsulfone, benzylmethylamine, dimethylbenzylamine, m-xylenediamine, pyridine, picoline, and α-methylbenzylmethylamine.

Examples of the modified amines include epoxy compound-added polyamine, Michael-added polyamine, Mannich-added polyamine, thiourea-added polyamine, ketone-blocked polyamine, dicyandiamide, guanidine, organic acid hydrazide, diaminomaleonitrile, aminimide, a boron trifluoride-piperidine complex, and a boron trifluoride-monoethylamine complex.

Examples of the imidazole type compounds include imidazole, 1-methylimidazole, 2-methylimidazole, 3-methylimidazole, 4-methylimidazole, 5-methylimidazole, 1-ethylimidazole, 2-ethyl imidazole, 3-ethyl imidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, a 2-phenylimidazoleisocyanuric acid adduct, a 2-methylimidazoleisocyanuric acid adduct, 2-phenyl-4,5-dihydroxymethylimidazole, 2-phenyl-4-methyl-5-hydroxymethylimidazole, 1-cyanoethyl-2-phenyl-4,5-di(2-cyanoethoxy)methylimidazole, 1-dodecyl-2-methyl-3-benzylimidazolium chloride, and 1-benzyl-2-phenylimidazole hydrochloride.

Examples of the imidazoline type compounds include 2-methylimidazoline and 2-phenylimidazoline.

Examples of the amide type compounds include polyamides obtained by condensation of a dimer acid and polyamine.

Examples of the ester type compounds include active carbonyl compounds such as aryl and thioaryl esters of carboxylic acid.

Examples of the phenol type compounds, the alcohol type compounds, the thiol type compounds, the ether type compounds, and the thioether type compounds include phenol resin curing agents including aralkyl type phenol resins such as a phenol aralkyl resin and a naphthol aralkyl resin, novolak type phenol resins such as a phenol novolak resin or a cresol novolak resin, modified resins thereof such as an epoxidized or butylated novolak type phenol resin, dicyclopentadiene modified phenol resins, para-xylene modified phenol resins, triphenolalkane type phenol resins, and polyfunctional type phenol resins. Also, examples thereof include polyol, polymercaptan, polysulfide, 2-(dimethylaminomethylphenol), 2,4,6-tris(dimethylaminomethyl)phenol, and tri-2-ethylhexyl hydrochloride of 2,4,6-tris(dimethylaminomethyl)phenol.

Examples of the urea type compounds, the thiourea type compounds, and the Lewis acid type compounds include butylated urea, butylated melamine, butylated thiourea, and boron trifluoride.

Examples of the phosphorus type compounds include organic phosphine compounds, for example, alkyl phosphine such as ethylphosphine and butylphosphine, and primary phosphine such as phenylphosphine; dialkylphosphine such as dimethylphosphine and dipropylphosphine, and secondary phosphine such as diphenylphosphine and methylethylphosphine; and tertiary phosphine such as trimethylphosphine, triethylphosphine, and triphenylphosphine.

Examples of the acid anhydride type compounds include phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, methylendomethylenetetrahydrophthalic anhydride, maleic anhydride, tetramethylenemaleic anhydride, trimellitic anhydride, chlorendic anhydride, pyromellitic anhydride, dodecenylsuccinic anhydride, benzophenonetetracarboxylic anhydride, ethyleneglycol bis(anhydrotrimellitate), glycerol tris(anhydrotrimellitate), methylcyclohexanetetracarboxylic anhydride, and polyazelaic anhydride.

Further, examples of the onium salt type compounds and the active silicon compound-aluminum complexes include aryldiazonium salts, diaryliodonium salts, triarylsulfonium salts, triphenylsilanol-aluminum complexes, triphenylmethoxysilane-aluminum complexes, silyl peroxide-aluminum complexes, and triphenylsilanol-tris(salicylaldehydato) aluminum complexes.

Examples of other additives include silane coupling agents such as vinyltrimethoxysilane, vinyltriethoxysilane, γ-glycidoxypropyltrimethoxysilane, glycidoxypropyltriethoxysilane, γ-methacryloxypropyltrimethoxysilane, γ-methacryloxypropyltriethoxysilane, γ-aminopropyltrimethoxysilane, γ-aminopropyltriethoxysilane, N-β(aminoethyl)γ-aminopropyltrimethoxysilane, N-β(aminoethyl)γ-aminopropyltriethoxysilane, N-phenyl-γ-aminopropyltrimethoxysilane, N-phenyl-γ-aminopropyltriethoxysilane, γ-mercaptopropyltrimethoxysilane, and γ-mercaptopropyltriethoxysilane; fillers such as calcium bicarbonate, light calcium carbonate, natural silica, synthetic silica, molten silica, kaolin, clay, titanium oxide, barium sulfate, zinc oxide, aluminum hydroxide, magnesium hydroxide, talc, mica, wollastonite, potassium titanate, aluminum borate, sepiolite, and xonotlite; elastomer modifiers such as NBR, polybutadiene, a chloroprene rubber, silicone, crosslinked NBR, crosslinked BR, acrylics, core shell acrylic, a urethane rubber, a polyester elastomer, functional group-containing liquid NBR, liquid polybutadiene, liquid polyester, liquid polysulfide, modified silicone, and a urethane prepolymer;

flame retardants such as hexabromocyclodecane, bis(dibromopropyl)tetrabromobisphenol A, tris(dibromopropyl) isocyanurate, tris(tribromoneopentyl)phosphate, decabromodiphenyl oxide, bis(pentabromo)phenylethane, tris(tribromophenoxy)triazine, ethylenebistetrabromophthalimide, polybromophenylindane, brominated polystyrene, tetrabromobisphenol A polycarbonate, brominated phenylene ethylene oxide, polypentabromobenzyl acrylate, triphenyl phosphate, tricresyl phosphate, trixynyl phosphate, cresyl diphenyl phosphate, xylyl diphenyl phosphate, cresyl bis(di-2,6-xylenyl)phosphate, 2-ethylhexyldiphenyl phosphate, resorcinol bis(diphenyl)phosphate, bisphenol A bis(diphenyl)phosphate, bisphenol A bis(dicresyl)phosphate, resorcinol bis(di-2,6-xylenyl)phosphate, tris(chloroethyl)phosphate, tris(chloropropyl)phosphate, tris(dichloropropyl) phosphate, tris(tribromopropyl)phosphate, diethyl-N,N-bis (2-hydroxyethyl)aminomethylphosphonate, oxalate anion-treated aluminum hydroxide, nitrate-treated aluminum hydroxide, hot water-treated aluminum hydroxide, a stannic acid surface-treated hydrated metal compound, nickel compound surface-treated magnesium hydroxide, silicone polymer surface-treated magnesium hydroxide, phlogopite, a multilayer surface-treated hydrated metal compound, and cation polymer-treated magnesium hydroxide; engineering plastics such as high density polyethylene, polypropylene, polystyrene, polymethyl methacrylate, polyvinyl chloride, nylon-6,6, polyacetal, polyethersulfone, polyetherimide, polybutylene terephthalate, polyetheretherketone, polycarbonate, and polysulfone; plasticizers; diluents such as n-butyl glycidyl ether, phenyl glycidyl ether, styrene oxide, t-butylphenyl glycidyl ether, dicyclopentadiene diepoxide, phenol, cresol, and t-butylphenol; extenders; reinforcing agents; colorants; thickening agents; and releasing agents such as a higher fatty acid, a higher fatty acid ester, and higher fatty acid calcium, for example, carnauba wax and polyethylene type wax. The amount of these additives to be compounded is not particularly limited, and can be appropriately determined within a limit that allows the effect of the present invention to be obtained.

Further, the epoxy resin composition of the present invention may contain, in addition to the epoxy resin, other resins. Examples of the other resins include a polyester resin, an acrylic resin, a silicon type resin, a polyurethane type resin, and an episulfide type resin.

The epoxy resin composition of the present invention can be suitably used in applications for curing an epoxy resin, such as applications for an epoxy resin type adhesive, an adhesion sheet, a semiconductor sealant, a liquid crystal sealant, a laminate for a printed wiring board, varnish, a powdery paint, a casting material, and an ink.

EXAMPLES

Hereinafter, the present invention will be described with reference to Examples, but the technical scope thereof is not intended to be limited to these Examples.

1 Synthesis of Clathrate

Reference Example 1

Synthesis of NIPA-2P4 MHZ Clathrate 80.6 mmol (15.16 g) of 2-phenyl-4-methyl-5-hydroxymethylimidazole (2P4 MHZ) was added under stirring to a solution obtained by placing 40.3 mmol (8.5 g) of 5-nitroisophthalic acid (NIPA) and 121 ml of methanol into a flask and mixing them, and the resulting solution was heated to reflux for 3 hours. Thereafter, the solution was left to stand at room temperature overnight, and then filtered and dried under vacuum to give 23.26 g (98.3% yield) of (NIPA: 2P4MHZ=1:2).

Reference Example 2

Synthesis of HIPA-2P4 MHZ Clathrate 109.8 mmol (20.67 g) of 2P4 MHZ was added over 15 minutes under stirring to a solution obtained by placing 109.8 mmol (20 g) of 5-hydroxyisophthalic acid (HIPA) and 250 ml of methanol into a flack and mixing them. After being left to stand for 2 hours, the resulting solution was heated to reflux for 3 hours. Thereafter, the solution was left to stand at room temperature overnight, and then filtered and dried under vacuum to give 39.56 g (97.3% yield) of (HIPA: 2P4 MHZ=1: 1).

Comparative Reference Example 1

460 ml of ethyl acetate was added to 142 mmol (56.6 g) of 1,1,2,2-tetrakis(4-hydroxyphenyl)ethane (TEP) and 258 mmol of 2-phenyl-4-methyl-5-hydroxymethylimidazole (2P4 MHZ), and the mixture was heated to reflux. Thereafter, while a crystal precipitated soon after stopping of heating, the mixture was left to stand at room temperature overnight, and then filtered and dried under vacuum to give a clathrate (TEP: 2P4 MHZ=1:2) (105.2 g, 96.2%).

Example 1

0.451 g of 1,1,2,2-tetrakis(4-hydroxyphenyl)ethane (TEP) was further mixed with 5 g of an epoxy resin (Epotohto YD-128 produced by Tohto Kasei Co., Ltd., epoxy equivalent: 184 to 194 g/eq) and 0.31202 g of the clathrate crystal NIPA-2P4 MHZ obtained in Reference Example 1, and the temperature thereof was raised to 175° C. by using a differential scanning calorimeter (DSC) (manufactured by TA Instruments) and this temperature was maintained for 60 minutes to allow the composition to be cured. Then, the temperature was returned to 30° C. and raised again, and thereby the glass transition point of the cured product was measured. FIG. 1 shows a thermal analysis (DSC) chart based on changes in temperature of the resin composition. The glass transition point of the resin composition was 160.57° C.

Comparative Example 1

Figure 2:
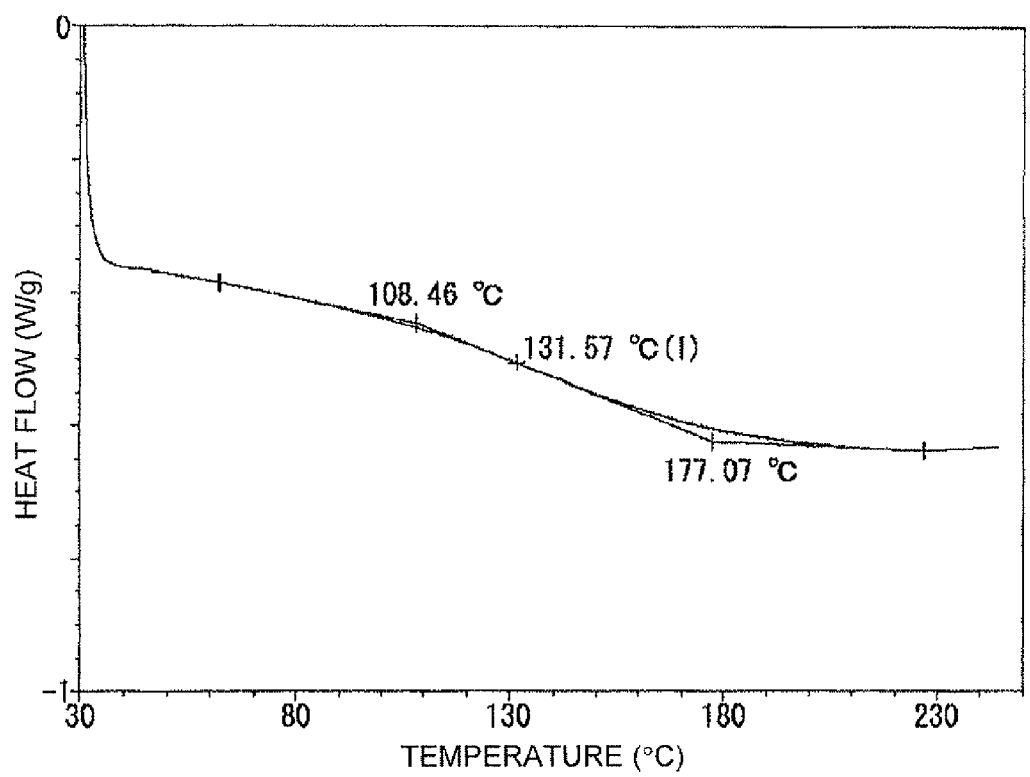
FIG. 2 is a diagram showing a thermal analysis (DSC) chart based on changes in temperature of a composition of Comparative Example 1.

5 g of an epoxy resin (Epotohto YD-128 produced by Tohto Kasei Co., Ltd., epoxy equivalent: 184 to 194 g/eq) and 0.31204 g of the clathrate crystal NIPA-2P4 MHZ obtained in Reference Example 1 were mixed and the glass transition point was measured in the same way as in Example 1. FIG. 2 shows a thermal analysis (DSC) chart based on changes in temperature of the resin composition. The glass transition point of the resin composition was 131.57° C.

Example 2

Figure 3:
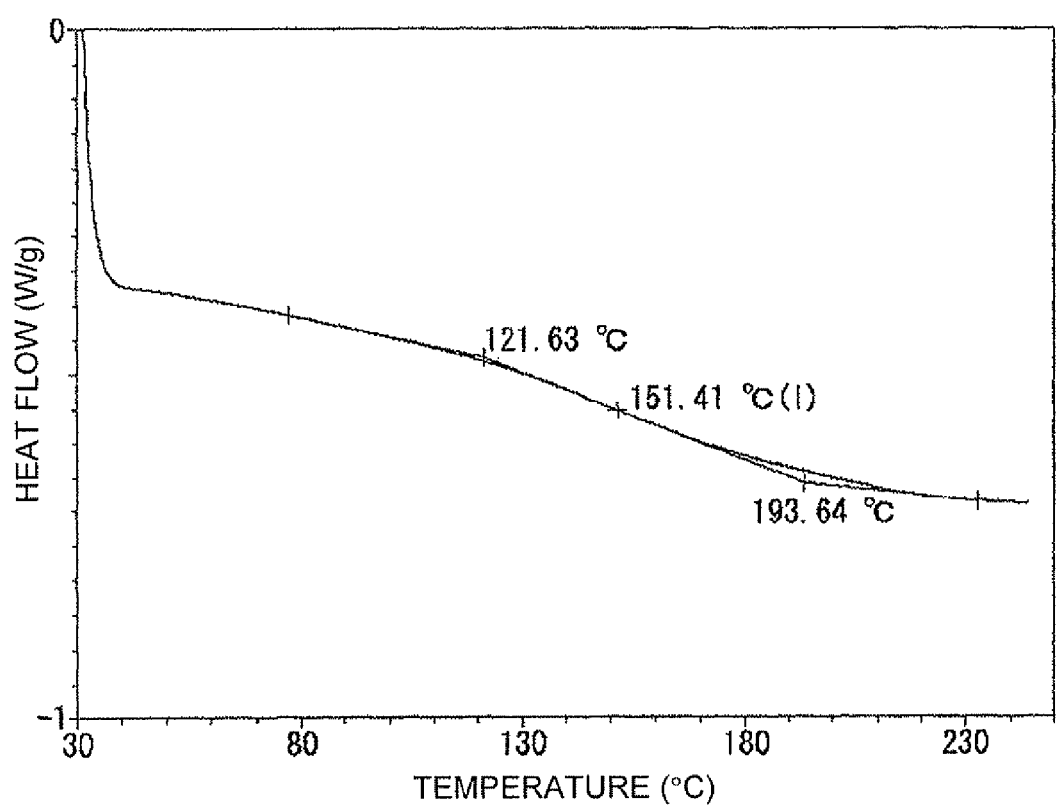
FIG. 3 is a diagram showing a thermal analysis (DSC) chart based on changes in temperature of a composition of Example 2.

0.451 g of 1,1,2,2-tetrakis(4-hydroxyphenyl)ethane (TEP) was further mixed with 5 g of an epoxy resin (Epotohto YD-128 produced by Tohto Kasei Co., Ltd., epoxy equivalent: 184 to 194 g/eq) and 0.39373 g of the clathrate crystal HIPA-2P4 MHZ obtained in Reference Example 2, and the glass transition point was measured in the same way as in Example 1. FIG. 3 shows a thermal analysis (DSC) chart based on changes in temperature of the resin composition. The glass transition point of the resin composition was 151.41° C.

Comparative Example 2

Figure 4:
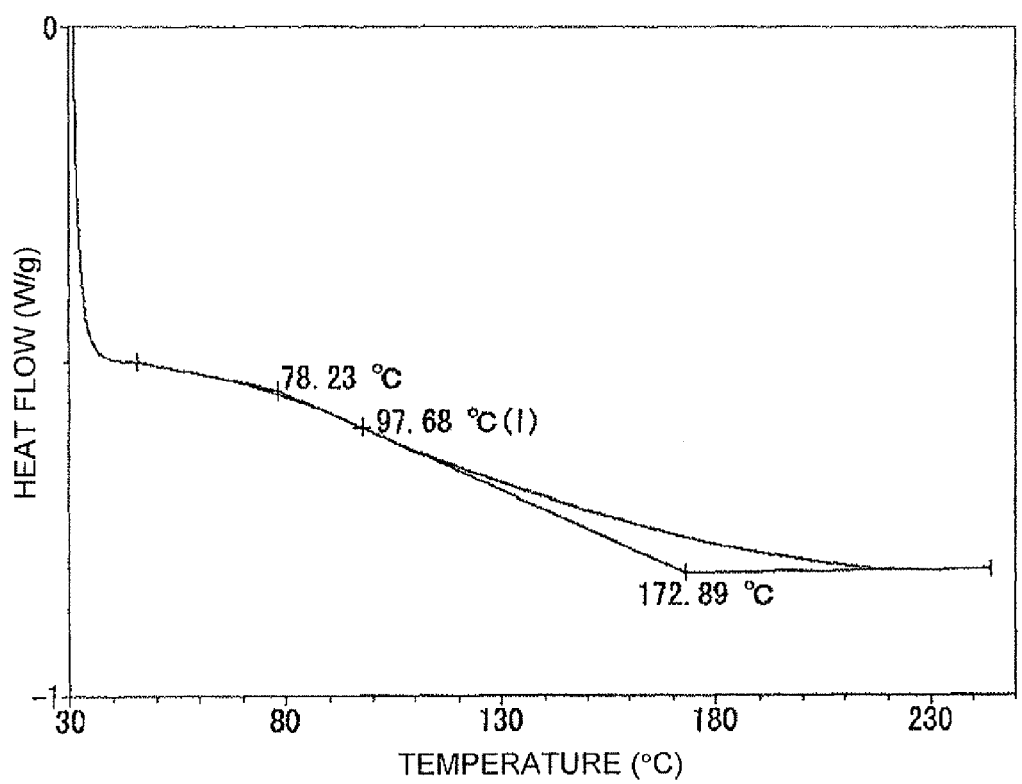
FIG. 4 is a diagram showing a thermal analysis (DSC) chart based on changes in temperature of a composition of Comparative Example 2.

5 g of an epoxy resin (Epotohto YD-128 produced by Tohto Kasei Co., Ltd., epoxy equivalent: 184 to 194 g/eq) and 0.39372 g of the clathrate crystal HIPA-2P4 MHZ obtained in Reference Example 2 were mixed and the glass transition point was measured in the same way as in Example 1. FIG. 4 shows a thermal analysis (DSC) chart based on changes in temperature of the resin composition. The glass transition point of the resin composition was 97.68° C.

Comparative Example 3

Figure 5:
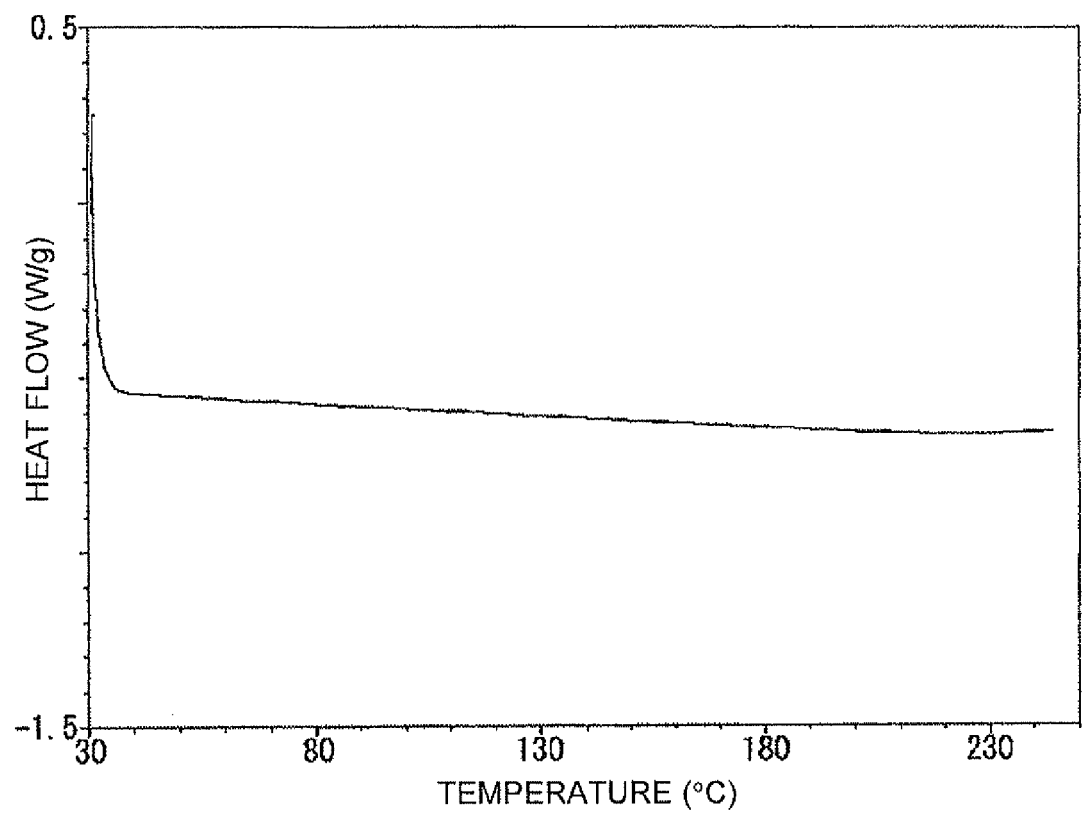
FIG. 5 is a diagram showing a thermal analysis (DSC) chart based on changes in temperature of a composition of Comparative Example 3.

5 g of an epoxy resin (Epotohto YD-128 produced by Tohto Kasei Co., Ltd., epoxy equivalent: 184 to 194 g/eq) and 0.22550 g of 1,1,2,2-tetrakis(4-hydroxyphenyl)ethane (TEP) were mixed, and subjected to a thermal analysis (DSC) based on changes in temperature under the same measurement conditions as in Example 1 by using a differential scanning calorimeter (DSC) (manufactured by TA Instruments). FIG. 5 shows a chart thereof. FIG. 5 indicates that there is no change in the state because of the constant increase in the amount of heat of the resin composition, thereby indicating that the epoxy resin does not react with TEP.

Examples 3 and 4

0.2 g each of the clathrate crystals NIPA-2P4 MHZ and HIPA-2P4 MHZ obtained in Reference Examples 1 and 2 in terms of 2P4 MHZ, and 1,1,2,2-tetrakis(4-hydroxyphenyl)ethane (TEP) in the compounding proportions described in Table 1 was further mixed with 5 g of an epoxy resin (Epotohto YD-128 produced by Tohto Kasei Co., Ltd., epoxy equivalent: 184 to 194 g/eq).

Thereafter, the mixture was heated to 110° C. by using a differential scanning calorimeter (DSC) (manufactured by TA Instruments), and the reaction peak time at 110° C. was determined.

Comparative Examples 4 and 5

0.2 g of 2P4 MHZ (Comparative Example 4) or TEP-2P4 MHZ obtained in Comparative Reference Example 1 in terms of 2P4 MHZ, and further 1,1,2,2-tetrakis(4-hydroxyphenyl)ethane (TEP) in the compounding proportions described in Table 1 were mixed with 5 g of an epoxy resin (Epotohto YD-128 produced by Tohto Kasai Co., Ltd., epoxy equivalent: 184 to 194 g/eq).

Thereafter, the mixture was heated to 110° C. by using a differential scanning calorimeter (DSC) (manufactured by TA Instruments), and the reaction peak time at 110° C. was determined.

It was observed that when TEP was added to the TEP-imidazole type clathrate compound, the reaction peak time remained unchanged, but when TEP was added to the carboxylic acid-imidazole type clathrate compound, the reaction peak time tended to be shorter because of the addition of TEP.

| | Composition | | | | Reaction peak time (min) |
|---|---|---|---|---|---|
| | Epoxy resin (g) | Clathrate compound | | TEP (*) (mol %) | |
| | | 2 P 4 MHZ (g) | Carboxylic acid (host compound) | | |
| Example 3 | 5 | 0.2 | NIPA | — | 86.4 |
| | 5 | 0.2 | NIPA | 5 | 83.1 |
| | 5 | 0.2 | NIPA | 10 | 80.4 |
| | 5 | 0.2 | NIPA | 20 | 71.0 |
| Example 4 | 5 | 0.2 | HIPA | — | 118.2 |
| | 5 | 0.2 | HIPA | 5 | 106.3 |
| | 5 | 0.2 | HIPA | 10 | 98.7 |
| Comp. Ex. 4 | 5 | 0.2 | — | — | 33.4 |
| Comp. Ex. 5 | 5 | 0.2 | TEP | — | 41.9 |
| | 5 | 0.2 | TEP | 5 | 42.8 |
| | 5 | 0.2 | TEP | 10 | 43.2 |

(*) TEP (mol %) denotes mol % relative to carboxylic acid (host compound).

INDUSTRIAL APPLICABILITY

The addition of a certain amount of a tetrakisphenol to a clathrate of a carboxylic acid derivative and an imidazole type compound can suppress a curing reaction at a low temperature to enhance one-pack stability, and also allow the glass transition point (Tg) of a cured epoxy resin to rise. Furthermore, the rising of the glass transition point allows various physical properties of a resin, such as heat resistance, to improve, thereby making it possible to provide a cured epoxy resin having a very high reliability.

It has been heretofore known that a tetrakisphenol compound forms a clathrate with an imidazole type compound so as to be used as a curing agent or a curing accelerator and that a tetrakisphenol compound is used as a curing accelerator by itself (for example, Japanese unexamined Patent Application Publication No. 2006-299281), but it has not been known that a tetrakisphenol compound is added to a clathrate compound to be used as a curing agent or a curing accelerator, thereby raising Tg of a cured product of an epoxy resin, as with the present invention.

The invention claimed is:
1. A composition for the formation of a cured epoxy resin, the composition comprising the following components (A), (B), and (C):
   (A) an epoxy resin;
   (B) a clathrate compound of:
      5-hydroxyisophthalic acid or 5-nitroisophthalic acid; and
      an imidazole compound selected from the group consisting of 2-ethyl-4-methylimidazole, 2-methylimidazole, 1-benzyl-2-methylimidazole, 2-heptadecylimidazole, 2-undecylimidazole; 2-phenyl-4-methyl-5-hydroxyethylimidazole, and 2-phenyl-4,5-dihydroxymethylimidazole; and
   (C) a tetrakisphenol compound represented by formula (III):

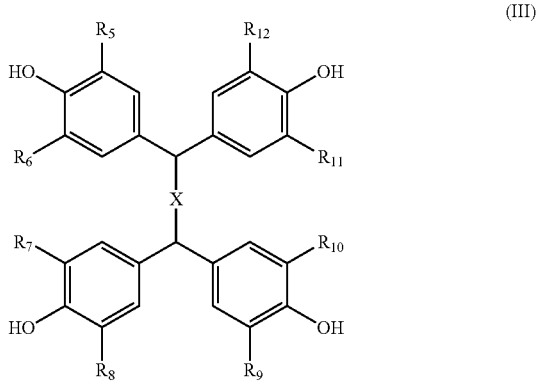

(III)

wherein:
   X represents $(CH_2)_{n1}$ or a p-phenylene group,
   n1 represents any integer of 0 to 3, and
   $R_5$ to $R_{12}$ each represents a hydrogen atom, a C1 to C6 alkyl group, an optionally substituted phenyl group, a halogen atom, or a C1 to C6 alkoxy group,
   wherein the composition comprises 0.01 to 1.0 mol of the imidazole compound in the component (B) with respect to 1 mol of an epoxy ring, and
   the amount of the tetrakisphenol compound is 1% by mol to 50% by mol with respect to an amount of 5-hydroxyisophthalic acid or 5-nitroisophthalic acid in the component (B).

2. The composition for the formation of a cured epoxy resin according to claim 1, wherein the clathrate compound in the component (B) is a curing catalyst for an epoxy resin.

3. A cured product of an epoxy resin obtained by curing the composition for the formation of a cured epoxy resin according to claim 1.

4. The composition for the formation of a cured epoxy resin according to claim 1, wherein the imidazole compound is 2-ethyl-4-methylimidazole or 2-phenyl-4-methyl-5-hydroxymethylimidazole.

5. The composition for the formation of a cured epoxy resin according to claim 1, wherein the amount of the tetrakisphenol type compound represented by formula (III) is 5% by mol to 20% by mol with respect to the amount of 5-hydroxyisophthalic acid or 5-nitroisophthalic acid in the component (B).

* * * * *

UNITED STATES PATENT AND TRADEMARK OFFICE
CERTIFICATE OF CORRECTION

PATENT NO. : 9,068,074 B2
APPLICATION NO. : 13/500999
DATED : June 30, 2015
INVENTOR(S) : Kazuo Ono et al.

It is certified that error appears in the above-identified patent and that said Letters Patent is hereby corrected as shown below:

IN THE CLAIMS

Column 19 line 13 please delete "methyl-5-hydroxyethylimidazole" and replace it with --methyl-5-hydroxymethylimidazole--.

Column 20 line 26 please delete "type".

Signed and Sealed this
First Day of December, 2015

Michelle K. Lee
*Director of the United States Patent and Trademark Office*